(12) United States Patent
Hoover et al.

(10) Patent No.: US 11,871,406 B2
(45) Date of Patent: Jan. 9, 2024

(54) SPLIT BEARER ROUND TRIP TIME (RTT) LATENCY OPTIMIZATION

(71) Applicant: QUALCOMM Incorporated, San Diego, CA (US)

(72) Inventors: Scott Hoover, Del Mar, CA (US); Yu Hu, San Diego, CA (US); Joshua Tennyson MacDonald, Superior, CO (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/464,510

(22) Filed: Sep. 1, 2021

(65) Prior Publication Data
US 2022/0078820 A1     Mar. 10, 2022

Related U.S. Application Data

(60) Provisional application No. 63/074,808, filed on Sep. 4, 2020.

(51) Int. Cl.
| | |
|---|---|
| *H04W 72/12* | (2023.01) |
| *H04W 72/1263* | (2023.01) |
| *H04W 72/0453* | (2023.01) |
| *H04W 76/28* | (2018.01) |

(52) U.S. Cl.
CPC ... *H04W 72/1263* (2013.01); *H04W 72/0453* (2013.01); *H04W 76/28* (2018.02)

(58) Field of Classification Search
None
See application file for complete search history.

(56) References Cited

U.S. PATENT DOCUMENTS

2017/0339744 A1*   11/2017   Latheef ............. H04W 52/0235

FOREIGN PATENT DOCUMENTS

| WO | 2017069875 A1 | 4/2017 |
|---|---|---|
| WO | 2020078407 A1 | 4/2020 |

OTHER PUBLICATIONS

3GPP TSG RAN WG2 Meeting #108, Further discussion on suspension of SCG,Reno, Nevada, US, Nov. 18-22, 2019, R2-1914364 (Year: 2019).*

(Continued)

*Primary Examiner* — Kouroush Mohebbi
(74) *Attorney, Agent, or Firm* — Seyfarth Shaw LLP

(57) ABSTRACT

A method for wireless communication performed by a user equipment (UE) includes transmitting an uplink message to a first base station associated with a first radio access technology (RAT). The method also includes transmitting one or more scheduling requests (SRs) to a second base station associated with a second RAT to trigger a connected mode discontinuous reception (CDRX) ON period. The method further includes receiving a downlink message from the second base station during the CDRX ON period in response to transmitting the uplink message to the first base station.

30 Claims, 8 Drawing Sheets

(56) References Cited

OTHER PUBLICATIONS

Intel Corporation, et al., "(TP for NR BL CR for TS 38.425): Flow Control solution for Split Bearer DL Packet Delay when the DRX-Configured UE Goes into Sleep in Assisting Leg," 3GPP Draft, 3GPP TSG-RAN WG3 Meeting AH-1807, R3-184203_FCSOL_SPLITBEARER_DRX (VS), 3rd Generation Partnership Project (3GPP), Mobile Competence Centre, 650, Route Des Lucioles, F-06921, Sophia-Antipolis Cedex, France, vol. RAN WG3. No. Montreal, Canada, Jul. 2, 2018-Jul. 6, 2018, Jun. 26, 2018 (Jun. 26, 2018), XP051530057, 6 pages.

International Search Report and Written Opinion—PCT/US2021/048875—ISA/EPO—dated Nov. 17, 2021.

Qualcomm Incorporated: "Further Discussion on Suspension of SCG", 3GPP Draft, 3GPP TSG RAN WG2 Meeting #108, R2-1914364, 3rd Generation Partnership Project (3GPP), Mobile Competence Centre, 650, Route Des Lucioles, F-06921, Sophia-Antipolis Cedex, France, vol. RAN WG2, No. Reno, Nevada, US, Nov. 18, 2019-Nov. 22, 2019, Nov. 8, 2019 (Nov. 8, 2019), 10 pages, XP051816448, Retrieved from the Internet: URL:https://ftp.3gpp.org/tsg_ran/WG2_RL2/TSGR2_108/Docs/R2-1914364.zip R2-1914364.

\* cited by examiner

SPLIT BEARER ROUND TRIP TIME (RTT) LATENCY OPTIMIZATION

CROSS-REFERENCE TO RELATED APPLICATION

The present application claims the benefit of U.S. Provisional Patent Application No. 63/074,808, filed on Sep. 4, 2020, and titled "RADIO (NR) SPLIT BEARER ROUND TRIP TIME (RTT) LATENCY OPTIMIZATION," the disclosure of which is expressly incorporated by reference in its entirety.

FIELD OF THE DISCLOSURE

Aspects of the present disclosure generally relate to wireless communications, and more particularly to techniques and apparatuses for improving 5G new radio (NR) split bearer round trip time (RTT) latency.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In one aspect of the present disclosure, a method for wireless communication at a user equipment (UE) includes transmitting an uplink message to a first base station associated with a first radio access technology (RAT). The method further includes transmitting one or more scheduling requests (SRs) to a second base station associated with a second RAT to trigger a connected mode discontinuous reception (CDRX) ON period. The method still further includes receiving a downlink message from the second base station during the CDRX ON period in response to transmitting the uplink message to the first base station.

Another aspect of the present disclosure is directed to an apparatus for wireless communication at a UE. The apparatus includes means for transmitting an uplink message to a first base station associated with a first RAT. The apparatus further includes means for transmitting one or more SRs to a second base station associated with a second RAT to trigger a CDRX ON period. The apparatus still further includes means for receiving a downlink message from the second base station during the CDRX ON period in response to transmitting the uplink message to the first base station.

In another aspect of the present disclosure, a non-transitory computer-readable medium with non-transitory program code recorded thereon wireless communication at a UE is disclosed. The program code is executed by a processor and includes program code to transmit an uplink message to a first base station associated with a first RAT. The program code further includes program code to transmit one or more SRs to a second base station associated with a second RAT to trigger a CDRX ON period. The program code still further includes program code to receive a downlink message from the second base station during the CDRX ON period in response to transmitting the uplink message to the first base station.

Another aspect of the present disclosure is directed to a UE. The UE includes a processor, a memory coupled with the processor, and instructions stored in the memory and operable, when executed by the processor, to cause the UE to transmit an uplink message to a first base station associated with a first RAT. Execution of the instructions further cause the UE to transmit one or more SRs to a second base station associated with a second RAT to trigger a CDRX ON period. Execution of the instructions also cause the UE to receive a downlink message from the second base station during the CDRX ON period in response to transmitting the uplink message to the first base station.

In one aspect of the present disclosure, a method for wireless communication by a first base station associated with a first RAT includes receiving, from a second base station of a second RAT, an uplink message transmitted by a UE. The method further includes receiving, during a CDRX OFF period of the UE, one or more SRs from the UE. The method still further includes transmitting, during a CDRX ON period of the UE, a downlink message in response to the uplink message, the CDRX ON period occurring after a first scheduled CDRX ON period and prior to a second scheduled CDRX ON period scheduled according to a CDRX cycle of the first RAT.

Another aspect of the present disclosure is directed to an apparatus for wireless communication by a first base station associated with a first RAT. The apparatus includes means for receiving, from a second base station of a second RAT, an uplink message transmitted by a UE. The apparatus further includes means for receiving, during a CDRX OFF period of the UE, one or more SRs from the UE. The apparatus still further includes means for transmitting, during a CDRX ON period of the UE, a downlink message in response to the uplink message, the CDRX ON period occurring after a first scheduled CDRX ON period and prior to a second scheduled CDRX ON period scheduled according to a CDRX cycle of the first RAT.

In another aspect of the present disclosure, a non-transitory computer-readable medium with non-transitory program code recorded thereon for wireless communication at a first base station associated with a first RAT is disclosed. The program code is executed by a processor and includes program code to receive, from a second base station of a second RAT, an uplink message transmitted by a UE. The program code further includes program code to receive, during a CDRX OFF period of the UE, one or more SRs from the UE. The program code still further includes program code to transmit, during a CDRX ON period of the UE, a downlink message in response to the uplink message, the CDRX ON period occurring after a first scheduled CDRX ON period and prior to a second scheduled CDRX ON period scheduled according to a CDRX cycle of the first RAT.

Another aspect of the present disclosure is directed to a first base station associated with a first RAT. The first base station includes a processor, a memory coupled with the processor, and instructions stored in the memory and operable, when executed by the processor, to cause the first base station to receive, from a second base station of a second RAT, an uplink message transmitted by a UE. Execution of the instructions also cause the first base station to receive, during a CDRX OFF period of the UE, one or more SRs from the UE. Execution of the instructions also further the first base station to transmit, during a CDRX ON period of the UE, a downlink message in response to the uplink message, the CDRX ON period occurring after a first scheduled CDRX ON period and prior to a second scheduled CDRX ON period scheduled according to a CDRX cycle of the first RAT.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
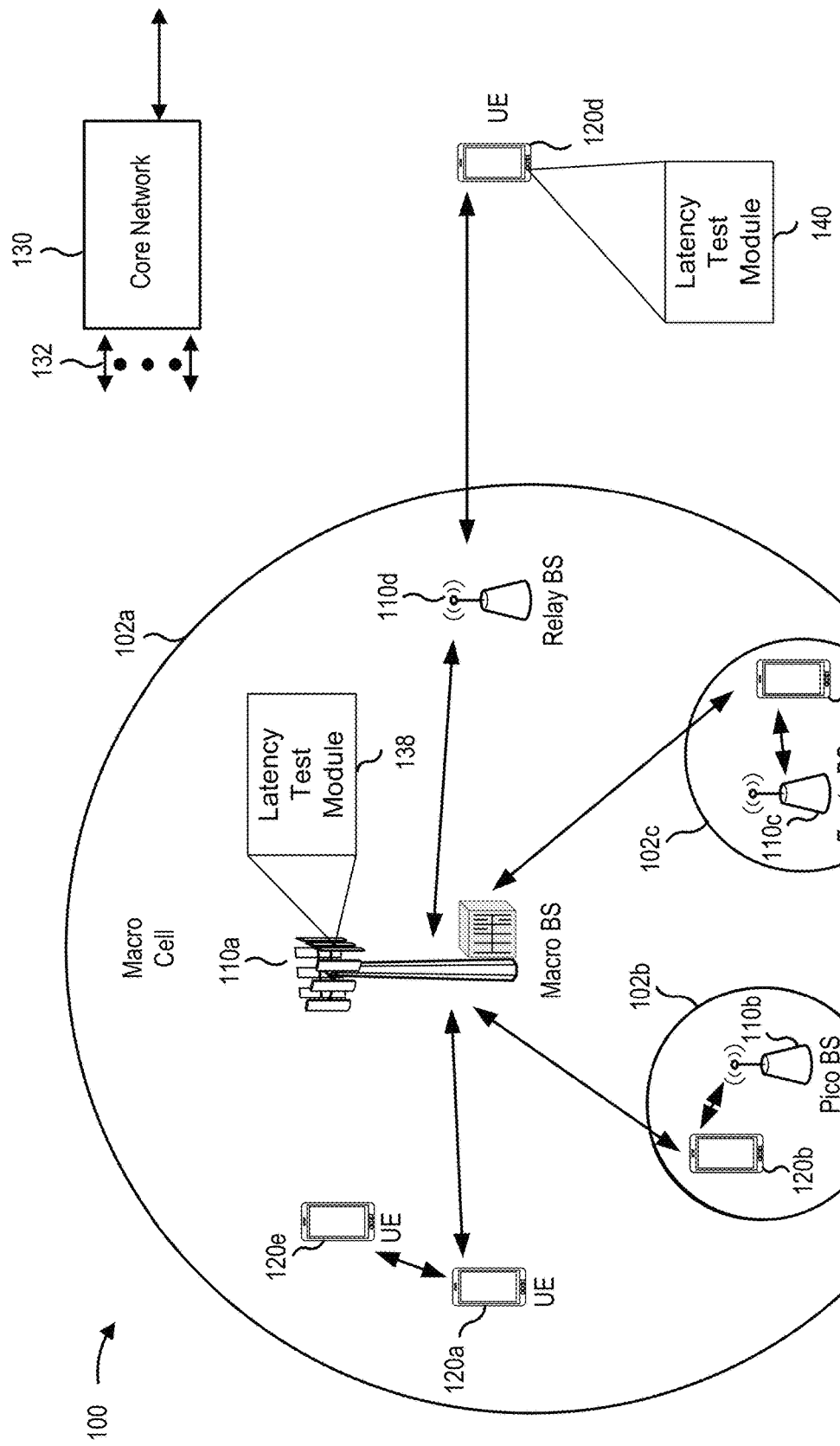
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In some deployment scenarios, a base station associated with a first radio access technology (RAT), such as a 5G new radio (NR) base station, may be deployed as a supplementary node (e.g., secondary node (SN)) to another base station associated with a second RAT, such as long-term evolution (LTE) base station. In such deployment scenarios, the base station associated with the second RAT may be deployed as a master node (MN). This type of deployment may also be referred to as a non-standalone (NSA) deployment using dual connectivity with inter-RAT base stations, such as LTE and 5G NR base stations. For ease of explanation, 5G NR may be referred to as NR. Different bearer types may be used for a non-standalone deployment, such as, a master cell group (MCG) bearer, secondary cell group (SCG) bearer, and split bearer. For the split bearer, traffic, such as user plane traffic, may be split between the base station associated with the first RAT (e.g., LTE) and the base station associated with the second RAT (e.g., NR).

In some cases, a user equipment (UE) may measure network latency based on a round trip time of a data packet. When using a split bearer, the round trip time may be the difference in time from transmitting a packet via an uplink channel associated with the first RAT and receiving a response via a downlink channel associated with the second RAT. In some examples, round trip time may be tested via a cross-radio access network (RAN) ping latency test. In conventional systems, a latency associated with a split bearer is larger in comparison to a latency associated with a standalone deployment. The increase in latency may be based on a delay of a connected mode discontinuous reception (CDRX) cycle, such as an NR CDRX cycle. Aspects of the present disclosure are directed to reducing latency of traffic across the split bearer.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a latency test module 140. For brevity, only one UE 120d is shown as including the latency test module 140. The latency test module 140 may transmits an uplink message to a first base station 110. The first base station 110 may be associated with a first radio access technology (RAT). The latency test module 140 also transmits a scheduling request to a second base station 110 associated with a second RAT to trigger an extended connected mode discontinuous reception (CDRX) ON period. The first RAT may be LTE or NR, and the second RAT may be NR. The latency test module 140 also receives a downlink message from the second base station 110 during the extended CDRX ON period in response to transmitting the uplink message to the first base station 110.

Additionally, one or more base stations 110, such as a first base station 110 may include a latency test module 138 for receiving, from a second base station 110 of a second RAT, an uplink message transmitted by a UE 120. The latency test module 138 may also receive, during a CDRX ON period of the UE 120, a scheduling request from the UE 120. The CDRX ON period may be activated after a first scheduled CDRX ON period and prior to a second scheduled CDRX ON period scheduled according to a CDRX cycle of the first RAT. The latency test module 138 also transmits, during an extension of the CDRX ON period of the UE 120, a downlink message in response to the uplink message.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
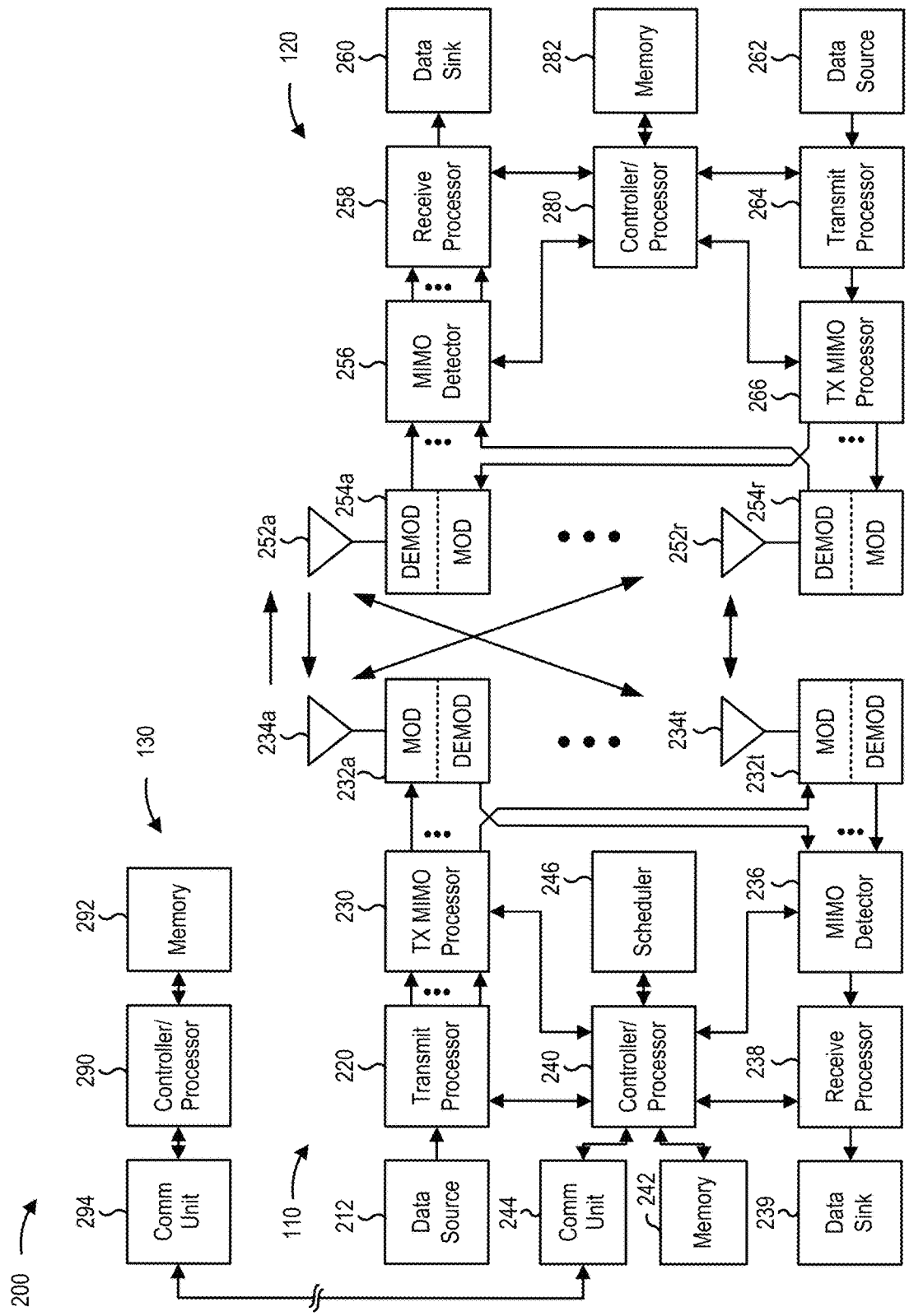
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with reducing round trip time (RTT) latency for cross-RAN latency testing as described in more detail elsewhere. For example, the controller/processor 240 of the base station 110, the controller/processor 280 of the UE 120, and/or any other component(s) of FIG. 2 may perform or direct operations of, for example, the process of FIGS. 7-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for transmitting an uplink message to a first base station associated with a first RAT; means for transmitting one or more scheduling requests to a second base station associated with a second RAT to trigger an extended CDRX ON period; and means for receiving a downlink message from the second base station during the extended CDRX ON period in response to transmitting the uplink message to the first base station.

In some aspects, the base station 110 may include means for receiving, from a second base station of a second RAT, an uplink message transmitted by a UE; means for receiving, during a connected mode discontinuous reception (CDRX) ON period of the UE, one or more scheduling requests from the UE; and means for transmitting, during an extension of the CDRX ON period of the UE, a downlink message in response to the uplink message.

Such means may include one or more components of the UE 120 or base station 110 described in connection with FIG. 2. As indicated above, FIG. 2 is provided merely as an example. Other examples may differ from what is described with regard to FIG. 2.

In some deployment scenarios, a base station associated with a first radio access technology (RAT), such as a 5G new radio (NR) base station, may be deployed as a supplementary node (e.g., secondary node (SN)) to another base station associated with a second RAT, such as long-term evolution (LTE) base station. In such deployment scenarios, the base station associated with the second RAT may be deployed as a master node (MN). This type of deployment may also be referred to as a non-standalone (NSA) deployment using dual connectivity with inter-RAT base stations, such as LTE and 5G NR base stations. Different bearer types may be used for a non-standalone deployment, such as, a master cell group (MCG) bearer, secondary cell group (SCG) bearer, and split bearer. For the split bearer, traffic, such as user plane traffic, may be split between the base station associated with the first RAT (e.g., LTE) and the base station associated with the second RAT (e.g., NR).

As described, a UE may measure network latency based on a round trip time of a data packet. For a split bearer, the round trip time may be the difference in time from transmitting a packet via an uplink channel associated with the first RAT and receiving a response via a downlink channel associated with the second RAT. In some examples, round trip time may be tested via a cross-RAN ping latency test.

In some examples, network latency may increase when the split bearer is employed in a non-standalone access (NSA) deployment. That is, network throughput may decrease when a UE transmits uplink traffic to an LTE base station and receives downlink traffic from an NR base station. In conventional systems, a round trip time (RTT) of a packet for a split bearer is greater than the RTT of a packet in a standalone NR deployment (e.g., non-split bearer deployment). That is, a latency of a split bearer deployment is higher than a latency of a standalone NR deployment. The increase in latency may be based on a delay of a connected mode discontinuous reception (CDRX) cycle, such as an NR CDRX cycle. Aspects of the present disclosure are directed to reducing latency of traffic across the split bearer.

Figure 3:
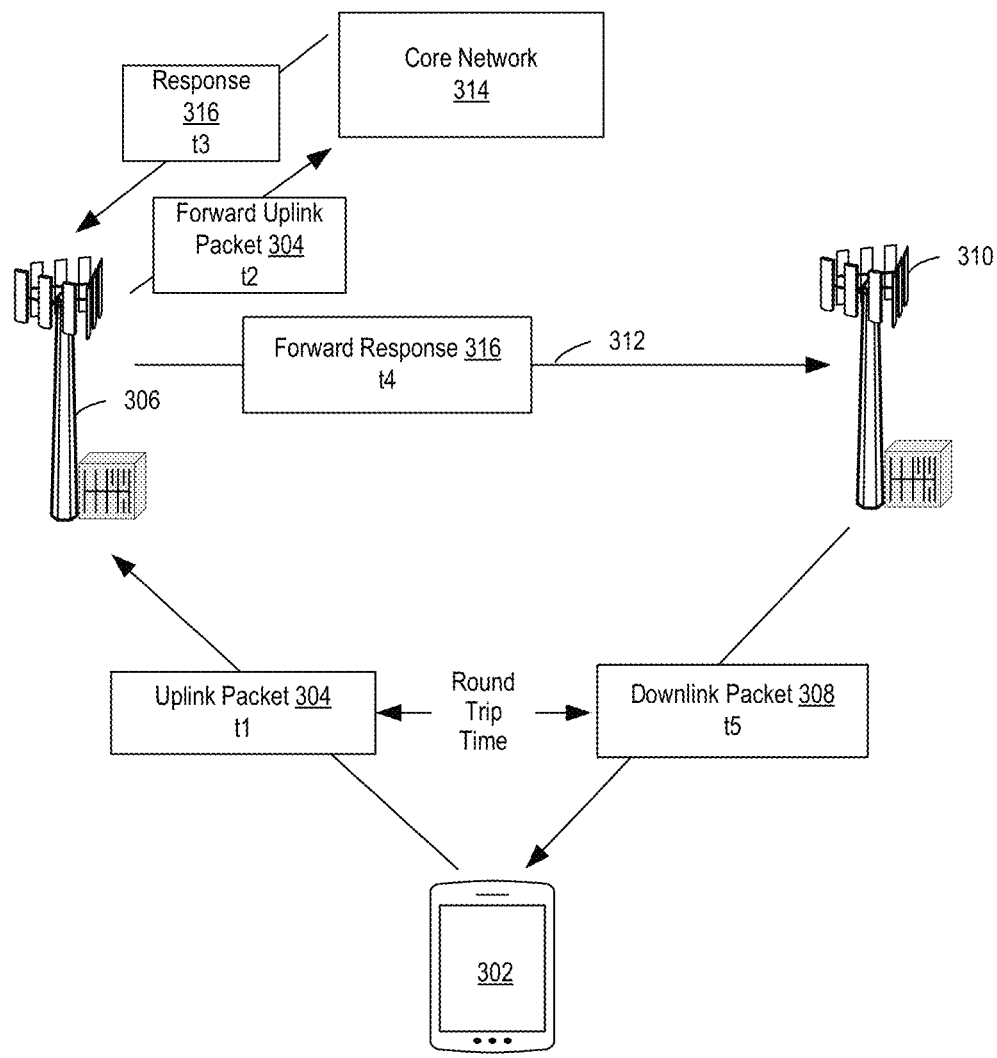
FIG. 3 is a timing diagram illustrating an example of cross-radio access network (RAN) latency testing.

FIG. 3 is a diagram illustrating an example of a cross-RAN ping latency test. As shown in FIG. 3, a UE 302 may transmit an uplink packet 304 to a first base station 306, at time t1. At time t2, the first base station 306 forwards the uplink packet 304 to the core network 314. The core network 314 may be an example of the core network 130 described with reference to FIG. 1. At time t3, the core network 314 transmits a response 316 to the uplink packet 304. As shown in FIG. 3, the response 316 is transmitted to the first base station 306. At time t4, the first base station 306 forwards the response 316 to the second base station 310 via a backhaul connection 312, such as an X2 interface. The backhaul connection 312 may be a split bearer. At time t5, the second base station 310 transmits the response 316, as a downlink packet 308, to the UE 302. In this example, the round trip time is the difference between time t1 and time t5.

In one configuration, the first base station 306 is a long-term evolution (LTE) base station (e.g., eNB) and the second base station 310 is a new radio (NR) base station (e.g., gNB). In another configuration, the first base station 306 and the second base station 310 are NR base stations. In this configuration, the first base station 306 may operate within a first frequency range (FR1), such as a sub-6 GHz frequency range, and the second base station 310 may operate within a second frequency range (FR2), such as a millimeter wave (mmW) frequency range. Alternatively, the first base station 306 may operate within FR2 and the second base station 310 may operate within FR1.

At the UE 302, when using the split bearer, an NR packet data convergence protocol (PDCP) module (not shown) may separate PDCP protocol data units (PDUs) for processing by a first radio link control (RLC) module (not shown) for a first RAT (e.g., LTE or NR) and a second RLC module (not shown) for a second RAT (e.g., NR) for respective transmission. In the current example, uplink transmissions are directed to the first RLC module.

Figure 4:
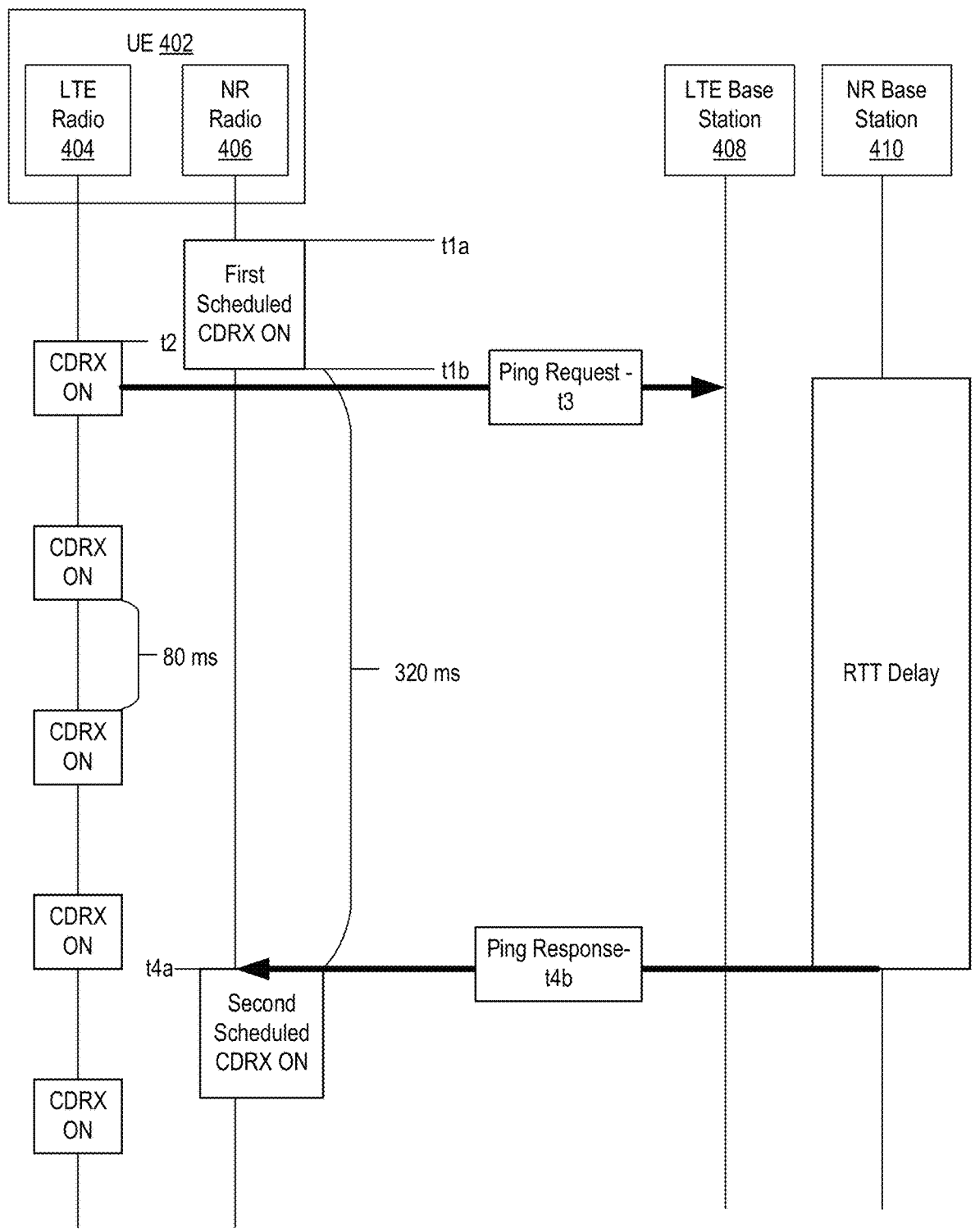
FIG. 4 is a timing diagram illustrating an example of cross-RAN latency testing.

A latency test based on the round trip time may be performed when connected mode discontinuous reception (CDRX) is enabled at the UE for both a radio associated with a first RAT, such as an LTE radio, and a radio associated with a second RAT, such as an NR radio. As described above, the increased round trip time may be due to a length of a CDRX cycle, such as an NR CDRX cycle. FIG. 4 is a timing diagram illustrating an example of cross-radio access network (RAN) latency testing. For exemplary purposes, the cross-RAN latency test shown in FIG. 4 is directed to a cross-RAN ping latency test. Still, as described, the latency test is not limited to a ping test. The latency test may be performed by measuring a round trip time between transmitting a first data packet to the first RAT (e.g., LTE) and receiving a second data packet from the second RAT (e.g., NR) in response to the first data packet. For example, the latency test may be performed when data is transmitted and received for a video game or web-browsing application. Additionally, as described, the first RAT is not limited to an LTE RAT. The first RAT and the second RAT may be NR RATs, where the first RAT and the second RAT operate in different NR frequency ranges (e.g., FR1 and FR2).

In the example of FIG. 4, CDRX is enabled for an LTE radio 404 and an NR radio 406 of a UE 402, such as the UE 120 described with reference to FIG. 1. At time t1a, the NR radio 406 enters a first scheduled CDRX ON period. Additionally, at time t2, the LTE radio 404 enters a CDRX ON period. The LTE radio 404 and NR radio 406 CDRX ON periods may overlap. At time t1b, the NR radio 406 transitions to a CDRX OFF period. In the example of FIG. 4, the LTE radio 404 transmits a ping request, at time t3, over an LTE uplink, to an LTE base station 408. In this example, the ping request falls within the CDRX OFF period of the NR radio 406. In conventional systems, an NR base station 410 (e.g., gNB) waits until the second scheduled CDRX ON period, at time t4a, to send the corresponding ping response on an NR downlink, at time t4b. The first and second scheduled CDRX ON periods may be scheduled based on a configuration of the CDRX cycle for the NR radio 406 (e.g., NR CDRX cycle). A CDRX period for the NR radio 406 may be referred to as an NR CDRX period. Also, a CDRX period for the LTE radio 404 may be referred to as an LTE CDRX period.

As shown in FIG. 4, the NR CDRX cycle is 320 ms. Thus, the NR base station 410 waits 320 ms until the next configured NR CDRX ON period (e.g., second scheduled CDRX ON period), at time t4a. In a best-case scenario, for a 320 ms NR CDRX cycle, when the ping request is transmitted at the end of the first scheduled CDRX cycle (e.g., time t1b), the delay may be 320 ms. In other scenarios, such as when the ping request is transmitted during an NR CDRX ON period, the delay may be greater than 320 ms. As shown in FIG. 4, the LTE CDRX cycle is 80 ms. The CDRX cycle refers to a period between CDRX ON periods. A CDRX ON period may also be referred to as a CDRX awake period. Also, a CDRX OFF period may be referred to as a CDRX sleep period.

As described with respect to the example of FIG. 4, for a split bearer system, the round trip time delay may be due to a length of the NR CDRX cycle. As previously described, a round trip time for a standalone test is less than the round trip time for the cross-RAN test.

Figure 5:
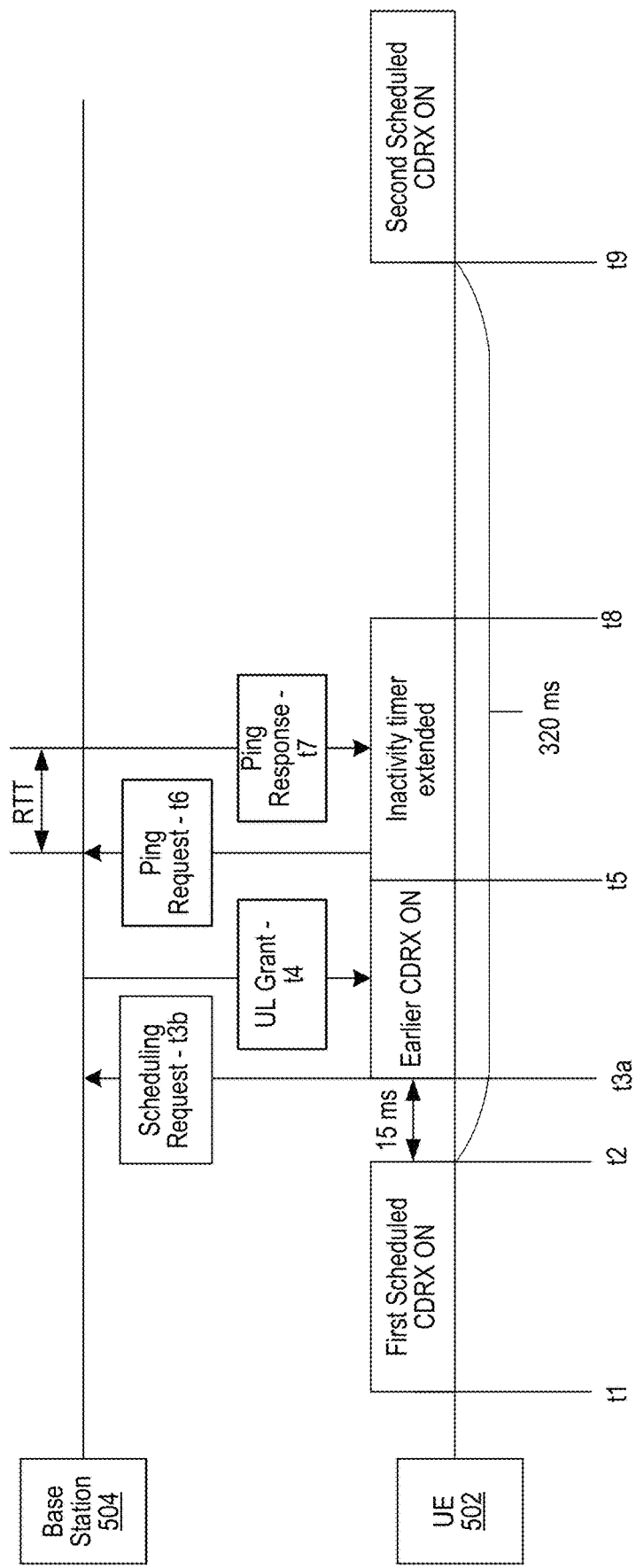
FIG. 5 is a timing diagram illustrating an example of standalone latency testing.

FIG. 5 is a timing diagram illustrating an example of standalone NR latency testing. As shown in FIG. 5, a UE 502 enters a first scheduled CDRX ON period, at time t1, and then enters a CDRX OFF period, at time t2. As described, the NR CDRX cycle is 320 ms. Based on the NR CDRX cycle, the second scheduled CDRX ON period is at time t9. Still, in the example of FIG. 5, when a UE 502 enters the CDRX OFF period (time t2), the UE 502 may enter a CDRX ON period earlier than a scheduled CDRX ON period to transmit a ping request. That is, as shown in the example of FIG. 5, the UE 502 enters a CDRX ON period (time t3a) to transmit a scheduling request to a base station 504, at time t3b. The scheduling request (time t3b) may be transmitted to receive an uplink grant for transmitting a ping request. The CDRX ON period may be extended in response to transmitting a scheduling request and receiving an uplink grant. A time period between entering the CDRX OFF period, at time t2, and entering the CDRX ON period, at time t3a, may be less than the CDRX cycle. For example, the time period between entering the CDRX OFF period, at time t2, and entering the CDRX ON period, at time t3a, may be 15 ms.

As shown in FIG. 5, the UE 502 receives an uplink (UL) grant from the base station 504, at time t4, in response to transmitting the scheduling request, at time t3a. As described, the CDRX ON period is extended in response to transmitting the scheduling request, at time t3b. The CDRX ON period may be extended by extending a CDRX inactivity timer in response to receiving an uplink grant at time t4. In the example of FIG. 5, the UE 502 extends the CDRX inactivity timer, at time t5, and transmits a ping request to the base station 504, at time t6. The timing of the ping request is not limited to time t6. Transmission of a ping request may occur prior to extending the CDRX inactivity timer (e.g., before time t5), at a time when the CDRX inactivity timer is extended (e.g., at time t5), or during a period of the CDRX inactivity timer (e.g., between times t5 and t8). In response to transmitting the ping request, at time t6, the UE 502 may receive a ping response from the base station 504, at time t7. The UE 502 may enter a CDRX OFF period, at time t8, upon expiration of the inactivity timer. Additionally, as shown in the example of FIG. 5, the UE 502 may enter a second scheduled CDRX ON period, at time t9. In the example of FIG. 5, the round trip time (RTT) is a time difference between sending the ping request, at time t6, and receiving the ping response, at time t7. In the example of FIG. 5, the RTT is not delayed due to the CDRX cycle.

According to aspects of the present disclosure, during a cross-RAN performance test with CDRX enabled, such as NR CDRX, a UE may transmit a scheduling request on an uplink associated with a first RAT, such as an NR RAT, before and/or after transmitting a ping request on an uplink associated with a second RAT, such as an LTE RAT. The UE may enter a CDRX ON period earlier than scheduled in response to transmitting the scheduling request. Accordingly, the ping response may be received earlier due to the earlier CDRX ON period.

Figure 6:
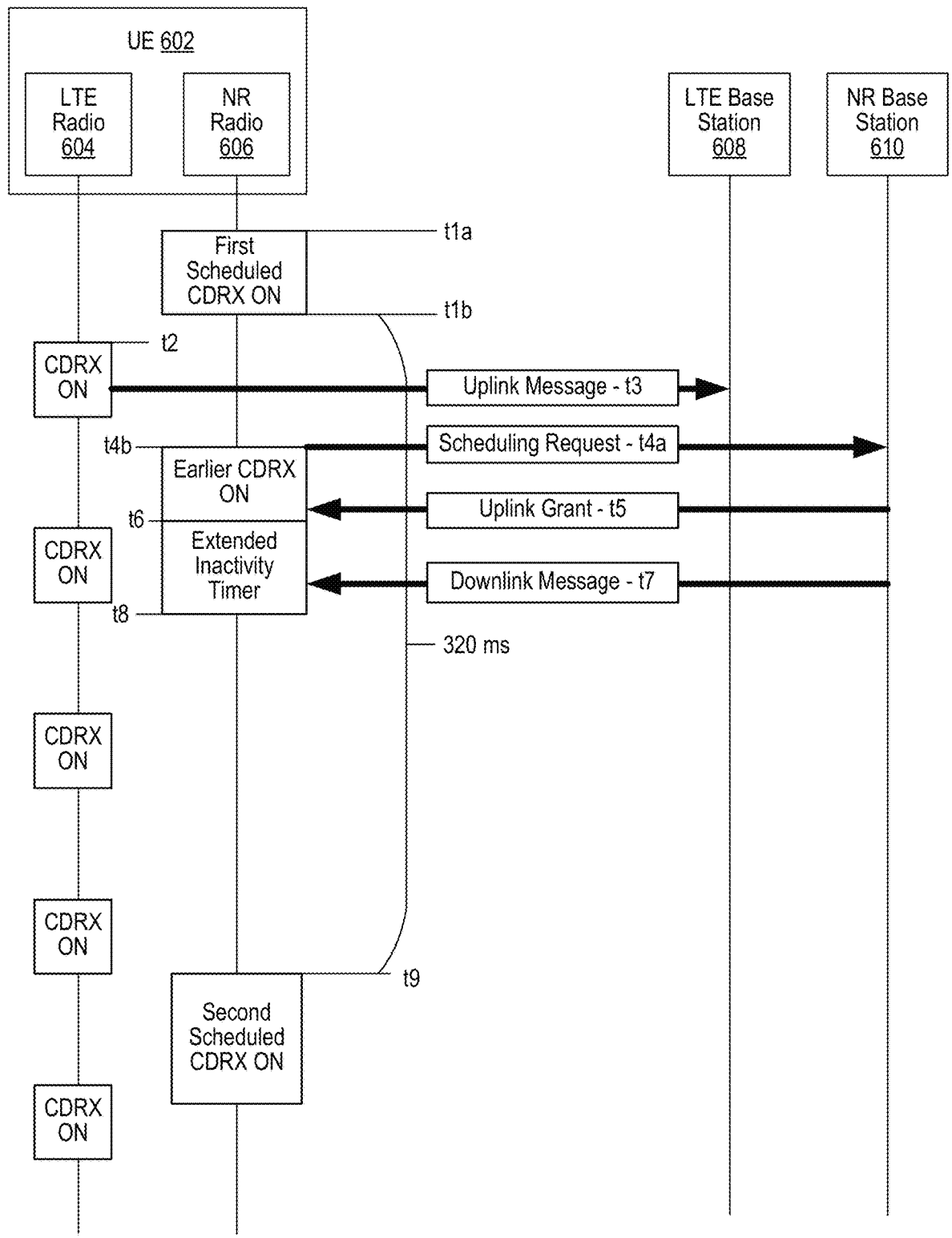
FIG. 6 is a timing diagram illustrating an example of cross-RAN latency testing, in accordance with aspects of the present disclosure.

FIG. 6 is a timing diagram illustrating an example of cross-radio access network (RAN) latency testing, in accordance with aspects of the present disclosure. In the example of FIG. 6, connected mode discontinuous reception (CDRX) is enabled for an LTE radio 604 and an NR radio 606 of a UE 602, such as the UE 120 described with reference to FIGS. 1 and 2. Additionally, in FIG. 6, the LTE base station and the NR base station may each be an example of a base station 110 described with reference to FIGS. 1 and 2. Furthermore, FIG. 6 uses LTE and NR as examples of different RATs, aspects of the present disclosure are not limited to LTE and NR. For example, as discussed, the first RAT is not limited to an LTE RAT. The first RAT and the second RAT may be NR RATs, where the first RAT and the second RAT operate in different NR frequency ranges (e.g., FR1 and FR2). In the example of FIG. 6, at time t1a, the NR radio 606 enters a first scheduled CDRX ON period. Additionally, at time t2, the LTE radio 604 enters a CDRX ON period. The LTE radio 604 and NR radio 606 CDRX ON periods may overlap. At time t1b, the NR radio 606 enters a CDRX OFF period. In the example of FIG. 6, the LTE radio 604 transmits an uplink message to the LTE base station 608, at time t3, over an LTE uplink and L2 interface. In this example, the uplink message falls within a CDRX OFF period. The uplink message may include a ping request, a data message, or control signaling. In one configuration, to reduce a round trip time between transmitting the uplink message (time t3) and receiving a corresponding downlink message, the UE 602 enters a CDRX ON period earlier than scheduled to transmit a scheduling request. In some examples, the scheduling request may be transmitted during a CDRX OFF period and transmission of the scheduling request may trigger the UE 602 to wake from the CDRX OFF period prior to a second scheduled CDRX ON period, at time t9, according to the CDRX cycle. In some examples, the uplink message and the corresponding downlink message may both include a data transfer.

For example, as shown in FIG. 6, the UE 602 transmits a scheduling request to the NR base station 610, at time t4a, and enters an earlier CDRX ON period, at time t4b, based on transmitting the scheduling request. In some other examples, the UE may first enter the CDRX ON period and then transmit the scheduling request. At time t5, the NR radio 606 receives a UL grant from the NR base station 610 in response to the scheduling request transmitted at time t4b. Transmitting the scheduling request, at time t4b, and receiving the UL grant, at time t5, extends the inactivity timer, at time t6, such that the earlier CDRX ON period is extended. In this example, the NR radio 606 may receive a downlink message from the NR base station 610, at time t7. The round trip time may be determined based on a time difference between transmitting the uplink message, at time t3, and receiving the downlink message, at time t7. In the example of FIG. 6, the round trip time is not delayed due to the CDRX cycle. The UE 602 may enter a CDRX OFF period, at time t8, upon expiration of the inactivity timer.

In the example of FIG. 6, the LTE scheduling request (time t4a) is transmitted after the UE 602 transmits the uplink message (time t3) on the LTE uplink. Aspects of the present disclosure are not limited to transmitting the scheduling request after transmitting the uplink message (e.g., ping request). In one configuration, the NR scheduling request is transmitted before the UE 602 transmits the uplink message via the LTE uplink. That is, the scheduling request may be transmitted before time t3. In some examples, the scheduling request may be transmitted before and after time t3. In another configuration, the NR scheduling request is scheduled based on a network delay, a scheduling request delay, and an inactivity timer duration. For example, a time for scheduling transmission of the scheduling request may be determined as: network delay (e.g., NW_DELAY_MARGIN)−(scheduling request delay (e.g., SR_Delay_time)+inactivity timer duration (e.g., inactivity_timer_duration)).

Additionally, as described, the UE 602 is not limited to calculating the round trip time based on a ping latency test. The round trip time may be determined based on the time difference between transmitting data via the LTE uplink and receiving a response to the data transmission on the NR downlink.

In some cases, depending on a duration of the inactivity timer, the UE 602 may issue multiple scheduling requests if the UE 602 did not receive the ping response on the NR downlink in response to the ping request transmitted on the LTE uplink. In one configuration, the UE 602 may continue extending the CDRX ON period until the ping response is received on the NR downlink.

As indicated above, FIGS. 3-6 are provided as examples. Other examples may differ from what is described with respect to FIGS. 3-6.

Figure 7:
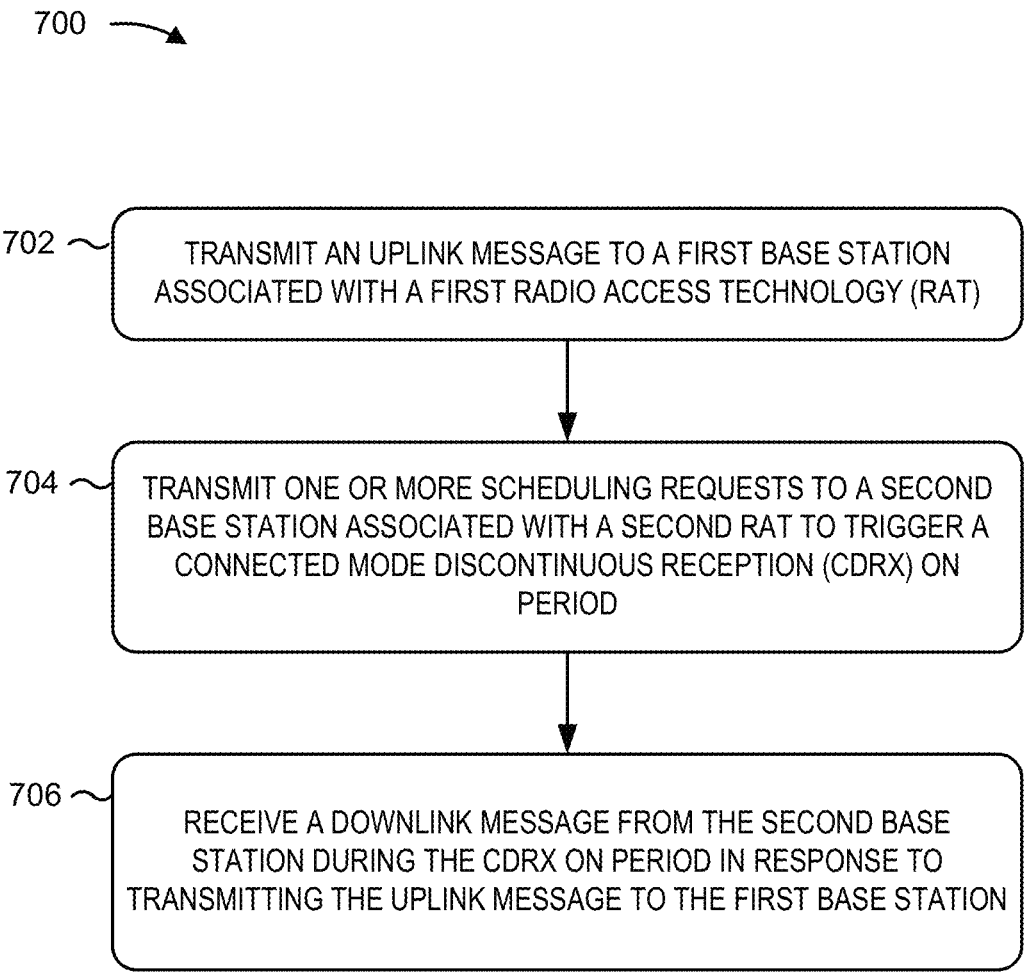
FIG. 7 is a flow diagram illustrating an example process performed, for example, by a UE, in accordance with various aspects of the present disclosure.

FIG. 7 is a flow diagram illustrating an example process 700 performed, for example, by a user equipment (UE) (e, in accordance with various aspects of the present disclosure. The UE may be an example of a UE 110 or 602 as described in FIGS. 1, 2, and 6, respectively. The example process 700 is an example of improving split bearer RTT latency.

As shown in FIG. 7, in some aspects, the process 700 may include transmitting an uplink message to a first base station associated with a first radio access technology (RAT) (block 702). For example, the UE (e.g., using the antenna 252, DEMOD/MOD 254, TX MIMO 266, transmit processor 264, controller/processor 280, and/or memory 282) can transmit an uplink message to a first base station (e.g., base station 110 or base station 306) associated with a first RAT, such as LTE or NR. In some aspects, the process 700 may include transmitting a scheduling request to a second base station associated with a second RAT to trigger a connected mode discontinuous reception (CDRX) ON period (block 704). For example, the UE (e.g., using the antenna 252, DEMOD/MOD 254, TX MIMO 266, transmit processor 264, controller/processor 280, and/or memory 282) can transmit one or more scheduling requests to a second base station (e.g., base station 110 or base station 608) associated with a second RAT, such as NR. The one or more scheduling requests may be transmitted before and/or after the uplink message.

As shown in FIG. 7, in some aspects, the process 700 may include receiving a downlink message from the second base station during the CDRX ON period in response to transmitting the uplink message to the first base station (block 706). For example, the UE (e.g., using the antenna 252, DEMOD/MOD 254, MIMO detector 256, receive processor 258, controller/processor 280, and/or memory 282) can receive a downlink message from the second base station (e.g., base station 110 or base station 608) associated with the second RAT, such as NR. In some examples, the downlink message may include a data transfer. Additionally, the uplink message may also include a data transfer.

Figure 8:
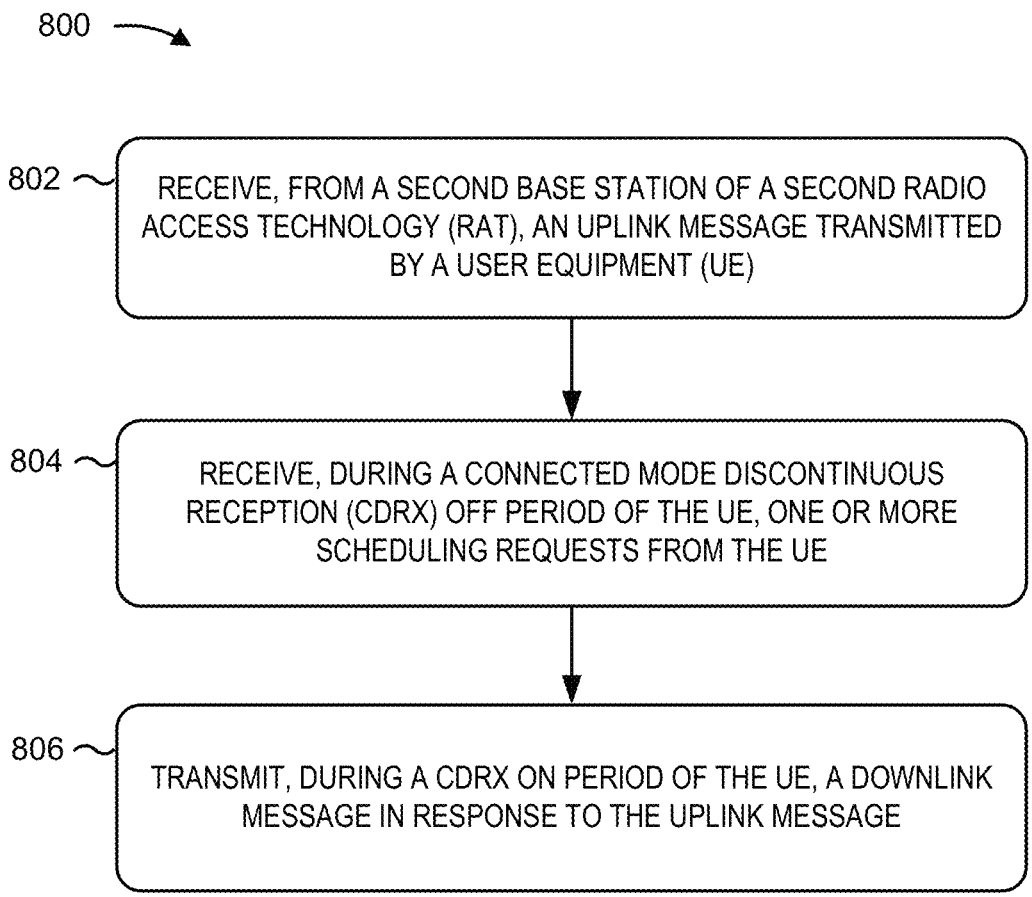
FIG. 8 is a flow diagram illustrating an example process performed, for example, by a base station, in accordance with various aspects of the present disclosure.

FIG. 8 is a flow diagram illustrating an example process 800 performed, for example, by a base station of a first RAT, such as NR, in accordance with various aspects of the present disclosure. The base station may be an example of the base station 110 or 610 as described in FIGS. 1, 2, and 6, respectively. The example process 800 is an example of improving NR split bearer RTT latency.

As shown in FIG. 8, in some aspects, the process 800 may include receiving, from a second base station of a second RAT, an uplink message transmitted by a UE (block 802). For example, a first base station of the first RAT (e.g., using the antenna 234, MOD/DEMOD 232, MIMO detector 236, receive processor 238, controller/processor 240, and/or memory 242) can receive, from a second base station associated with second RAT, an uplink message transmitted by a UE. In some aspects, the process 800 may include receiving, during a connected mode discontinuous reception (CDRX) OFF period of the UE, one or more scheduling requests from the UE (block 804). The one or more scheduling requests may be transmitted by the UE before and/or after the uplink message. A CDRX ON period may be triggered at the UE based on the UE transmitting the one or more scheduling requests. The CDRX ON period may be activated after a first scheduled CDRX ON period and prior to a second scheduled CDRX ON period scheduled according to a CDRX cycle of the first RAT For example, the first base station (e.g., using the antenna 234, MOD/DEMOD 232, MIMO detector 236, receive processor 238, controller/processor 240, and/or memory 242) can receive a scheduling request from the UE (e.g., UE 120 or UE 602).

As shown in FIG. 8, in some aspects, the process 800 may include transmitting, during a CDRX ON period of the UE, a downlink message in response to the uplink message (block 806). For example, the first base station (e.g., using the antenna 234, MOD/DEMOD 232, TX MIMO processor 230, transmit processor 220, controller/processor 240, and/or memory 242) can transmit a downlink message. In some examples, the downlink message may include a data transfer. Additionally, the uplink message may also include a data transfer.

Implementation examples are described in the following numbered clauses:

Clause 1. A method for wireless communication performed by a UE, comprising: transmitting an uplink message to a first base station associated with a first radio access technology (RAT); transmitting one or more scheduling requests (SRs) to a second base station associated with a second RAT to trigger a connected mode discontinuous reception (CDRX) ON period; and receiving a downlink message from the second base station during the CDRX ON period in response to transmitting the uplink message to the first base station.

Clause 2. The method of Clause 1, in which the one or more SRs comprise one or both of a first SR transmitted before the uplink message or a second SR transmitted after the uplink message.

Clause 3. The method of any of Clauses 1-2, further comprising measuring a round trip time based on a time difference between transmitting the uplink message and receiving the downlink message.

Clause 4. The method of any of Clauses 1-3, in which: the uplink message comprises a ping request; and the downlink message comprising a ping response.

Clause 5. The method of any of Clauses 1-3, in which the uplink message comprises a data transfer and the downlink message comprises a data transfer.

Clause 6. The method of any of Clauses 1-5, in which the first RAT is long term evolution (LTE) and the second RAT is new radio (NR).

Clause 7. The method of any of Clauses 1-5, in which the first RAT is new radio (NR) operating in a first frequency range and the second RAT is NR operating in a second frequency range.

Clause 8. The method of Clause 7, in which: the first frequency range is FR1 and the second frequency range is FR2; or the first frequency range is FR2 and the second frequency range is FR1.

Clause 9. The method of any of Clauses 1-8, further comprising: transitioning from a first scheduled CDRX ON period to a CDRX OFF prior to transmitting the uplink message; entering an earlier CDRX ON period prior to a second scheduled CDRX ON period to transmit an SR of the one or more SRs; transmitting the SR of the one or more SRs during the earlier CDRX ON period; and receiving an uplink grand during the earlier CDRX ON period.

Clause 10. The method of Clause 9, further comprising extending the earlier CDRX ON period in response to transmitting the one or more SRs.

Clause 11. The method of Clause 10, in which extending the earlier CDRX ON period comprises extending an inactivity timer.

Clause 12. The method of Clause 9, further comprising scheduling the first scheduled CDRX ON period and the second CDRX ON period according to a CDRX cycle.

Clause 13. The method of any of Clauses 1-12, further comprising scheduling the transmitting of the one or more SRs as a function of a network delay, a scheduling request delay, and a duration of an inactivity timer.

Clause 14. The method of any of Clauses 1-13, in which the UE supports a split bearer configuration.

Clause 15. A method performed by a first base station associated with first radio access technology (RAT), comprising: receiving, from a second base station of a second RAT, an uplink message transmitted by a user equipment (UE); receiving, during a connected mode discontinuous reception (CDRX) OFF period of the UE, one or more scheduling requests (SRs) from the UE; and transmitting, during a CDRX ON period of the UE, a downlink message in response to the uplink message, the CDRX ON period occurring after a first scheduled CDRX ON period and prior to a second scheduled CDRX ON period scheduled according to a CDRX cycle of the first RAT.

Clause 16. The method of Clause 15, in which the one or more SRs comprise one or both of a first SR transmitted before the uplink message or a second SR transmitted after the uplink message.

Clause 17. The method of any of Clauses 15-16, in which: the uplink message comprises a ping request; and the downlink message comprising a ping response.

Clause 18. The method of any of Clauses 15-16, in which the uplink message comprises a data transfer and the downlink message comprises a data transfer.

Clause 19. The method of any of Clauses 15-18, further comprising determining that the CDRX ON period is extended based on receiving the one or more SRs.

Clause 20. The method of any of Clauses 15-19, in which: the first base station operates in a non-standalone (NSA) mode or a new radio (NR) dual connectivity (NRDC) mode; and the first base station supports a split bearer configuration.

Clause 21. The method of any of Clauses 15-20, in which the first RAT is new radio (NR) and the second RAT is long term evolution (LTE).

Clause 22. The method of any of Clauses 15-20, in which the first RAT is new radio (NR) operating in a first frequency range and the second RAT is NR operating in a second frequency range.

Clause 23. The method of Clause 22, in which: the first frequency range is FR1 and the second frequency range is FR2; or the first frequency range is FR2 and the second frequency range is FR1.

Clause 24. A user equipment (UE) comprising a processor, memory coupled with the processor, and instructions stored in the memory and operable, when executed by the processor to cause the UE to perform any one of Clauses 1 through 14.

Clause 25. An apparatus configured for wireless communications comprising at least one means for performing any one of Clauses 1 through 14.

Clause 26. A computer program comprising code for causing an apparatus to perform any one of Clauses 1 through 14.

Clause 27. A first base station comprising a processor, memory coupled with the processor, and instructions stored in the memory and operable, when executed by the processor to cause the UE to perform any one of Clauses 15 through 23.

Clause 28. An apparatus configured for wireless communications comprising at least one means for performing any one of Clauses 15 through 23.

Clause 29. A computer program comprising code for causing an apparatus to perform any one of Clauses 15 through 23.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a user equipment (UE), comprising:
    transmitting an uplink message to a first network entity associated with a first radio access technology (RAT);
    entering a connected mode discontinuous reception (CDRX) ON period to transmit one or more scheduling requests (SRs) to a second network entity associated with a second RAT;
    transmitting the one or more SRs to the second network entity associated with the second RAT during the CDRX ON period; and
    receiving a downlink message from the second network entity during the CDRX ON period in response to transmitting the uplink message to the first network entity.

2. The method of claim 1, in which the one or more SRs comprise one or both of a first SR transmitted before the uplink message or a second SR transmitted after the uplink message.

3. The method of claim 1, further comprising measuring a round trip time based on a time difference between transmitting the uplink message and receiving the downlink message.

4. The method of claim 1, in which:
    the uplink message comprises a ping request; and
    the downlink message comprising a ping response.

5. The method of claim 1, in which the uplink message comprises a data transfer and the downlink message comprises a data transfer.

6. The method of claim 1, in which the first RAT is long term evolution (LTE) and the second RAT is new radio (NR).

7. The method of claim 1, in which the first RAT is new radio (NR) operating in a first frequency range and the second RAT is NR operating in a second frequency range.

8. The method of claim 7, in which:
the first frequency range is FR1 and the second frequency range is FR2; or
the first frequency range is FR2 and the second frequency range is FR1.

9. The method of claim 1, wherein the CDRX ON period is after a first scheduled CDRX ON period and prior to a second scheduled CDRX ON period, and the method further comprises:
transitioning from the first scheduled CDRX ON period to a CDRX OFF prior to transmitting the uplink message; and
receiving an uplink grand during the earlier CDRX ON period prior to the second scheduled CDRX ON period in response to transmitting the one or more SRs to the second network entity.

10. The method of claim 9, further comprising extending the CDRX ON period in response to transmitting the one or more SRs.

11. The method of claim 10, in which extending the CDRX ON period comprises extending an inactivity timer.

12. The method of claim 9, further comprising scheduling the first scheduled CDRX ON period and the second CDRX ON period according to a CDRX cycle.

13. The method of claim 1, further comprising scheduling the transmitting of the one or more SRs as a function of a network delay, a scheduling request delay, and a duration of an inactivity timer.

14. The method of claim 1, in which the UE supports a split bearer configuration.

15. A method performed by a first network entity associated with first radio access technology (RAT), comprising:
receiving, from a second network entity of a second RAT, an uplink message transmitted by a user equipment (UE);
receiving, during a connected mode discontinuous reception (CDRX) ON period of the UE, one or more scheduling requests (SRs) from the UE; and
transmitting, during the CDRX ON period of the UE, a downlink message in response to the uplink message, the CDRX ON period occurring after a first scheduled CDRX ON period and prior to a second scheduled CDRX ON period scheduled according to a CDRX cycle of the first RAT.

16. The method of claim 15, in which the one or more SRs comprise one or both of a first SR transmitted before the uplink message or a second SR transmitted after the uplink message.

17. The method of claim 15, in which:
the uplink message comprises a ping request; and
the downlink message comprising a ping response.

18. The method of claim 15, in which the uplink message comprises a data transfer and the downlink message comprises a data transfer.

19. The method of claim 15, further comprising determining that the CDRX ON period is extended based on receiving the one or more SRs.

20. The method of claim 15, in which:
the first network entity operates in a non-standalone (NSA) mode or a new radio (NR) dual connectivity (NRDC) mode; and
the first network entity supports a split bearer configuration.

21. The method of claim 15, in which the first RAT is new radio (NR) and the second RAT is long term evolution (LTE).

22. The method of claim 15, in which the first RAT is new radio (NR) operating in a first frequency range and the second RAT is NR operating in a second frequency range.

23. The method of claim 22, in which:
the first frequency range is FR1 and the second frequency range is FR2; or
the first frequency range is FR2 and the second frequency range is FR1.

24. A user equipment (UE), comprising:
a processor,
memory coupled with the processor; and
instructions stored in the memory and operable, when executed by the processor, to cause the UE:
to transmit an uplink message to a first network entity associated with a first radio access technology (RAT);
to enter a connected mode discontinuous reception (CDRX) ON period to transmit one or more scheduling requests (SRs) to a second network entity associated with a second RAT;
to transmit the one or more SRs to the second network entity associated with the second RAT during the CDRX ON period; and
to receive a downlink message from the second network entity during the CDRX ON period based on transmitting the uplink message to the first network entity.

25. The UE of claim 24, in which execution of the instructions further cause the UE to measure a round trip time based on a time difference between transmitting the uplink message and receiving the downlink message.

26. The UE of claim 24, in which the one or more SRs comprise one or both of a first SR transmitted before the uplink message or a second SR transmitted after the uplink message.

27. The UE of claim 24, in which the uplink message comprises a data transfer and the downlink message comprises a data transfer.

28. The UE of claim 24, in which:
the uplink message comprises a ping request; and
the downlink message comprises a ping response.

29. The UE of claim 24, in which the CDRX ON period is after a first scheduled CDRX ON period and prior to a second scheduled CDRX ON period, and execution of the instructions further cause the UE:
to transition from the first scheduled CDRX ON period to a CDRX OFF prior to transmitting the uplink message; and
to receive an uplink grand during the CDRX ON period prior to the second scheduled CDRX ON period in response to transmission of the one or more SRs to the second network entity.

30. A first network entity associated with first radio access technology (RAT), comprising:
a processor,
memory coupled with the processor; and
instructions stored in the memory and operable, when executed by the processor, to cause the first network entity:
to receive, from a second network entity of a second RAT, an uplink message transmitted by a user equipment (UE);

to receive, during a connected mode discontinuous reception (CDRX) ON period of the UE, one or more scheduling requests (SRs) from the UE; and to transmit, during the CDRX ON period of the UE, a downlink message in response to the uplink message, the CDRX ON period occurring after a first scheduled CDRX ON period and prior to a second scheduled CDRX ON period scheduled according to a CDRX cycle of the first RAT.

\* \* \* \* \*